United States Patent
Whynot

(10) Patent No.: US 8,762,577 B2
(45) Date of Patent: Jun. 24, 2014

(54) METHOD AND SYSTEM FOR PROVIDING NETWORK SYNCHRONIZATION WITH A UNIFIED MESSAGING SYSTEM

(75) Inventor: Stephen R. Whynot, Richardson, TX (US)

(73) Assignee: Apple Inc., Cupertino, CA (US)

( * ) Notice: Subject to any disclaimer, the term of this patent is extended or adjusted under 35 U.S.C. 154(b) by 2366 days.

(21) Appl. No.: 10/610,515

(22) Filed: Jun. 30, 2003

(65) Prior Publication Data

US 2004/0267963 A1 Dec. 30, 2004

(51) Int. Cl.
G06F 15/16 (2006.01)

(52) U.S. Cl.
USPC .......................... 709/248; 709/206; 715/203

(58) Field of Classification Search
USPC .................. 709/206, 246, 248; 715/501.1
See application file for complete search history.

(56) References Cited

U.S. PATENT DOCUMENTS

| | | | |
|---|---|---|---|
| 5,619,555 A | 4/1997 | Fenton et al. | |
| 5,710,591 A | 1/1998 | Bruno et al. | |
| 5,812,653 A | 9/1998 | Jodoin et al. | |
| 5,889,945 A | 3/1999 | Porter et al. | |
| 5,948,059 A * | 9/1999 | Woo et al. | 709/206 |
| 5,961,590 A * | 10/1999 | Mendez et al. | 709/206 |
| 6,018,762 A * | 1/2000 | Brunson et al. | 709/206 |
| 6,125,115 A | 9/2000 | Smits | |
| 6,185,565 B1 | 2/2001 | Meubus et al. | |
| 6,360,272 B1 * | 3/2002 | Lincke et al. | 709/238 |
| 6,549,612 B2 * | 4/2003 | Gifford et al. | 379/67.1 |
| 6,697,458 B1 * | 2/2004 | Kunjibettu | 379/88.17 |
| 6,792,085 B1 * | 9/2004 | Rigaldies et al. | 379/88.13 |
| 6,944,651 B2 * | 9/2005 | Onyon et al. | 709/217 |
| 6,983,308 B1 * | 1/2006 | Oberhaus et al. | 709/206 |
| 6,993,561 B2 * | 1/2006 | Lincke et al. | 709/206 |
| 6,999,469 B1 * | 2/2006 | Chu et al. | 370/466 |
| 7,024,457 B1 * | 4/2006 | Newman et al. | 709/206 |
| 7,107,314 B2 * | 9/2006 | Cox | 709/205 |
| 2002/0131561 A1 | 9/2002 | Gifford et al. | |
| 2003/0018721 A1 | 1/2003 | Gupta et al. | |
| 2003/0212753 A1 * | 11/2003 | Lai | 709/217 |
| 2006/0013368 A1 * | 1/2006 | LaBaw | 379/88.13 |

* cited by examiner

*Primary Examiner* — Mohamed Ibrahim
(74) *Attorney, Agent, or Firm* — Meyertons, Hood, Kivlin, Kowert & Goetzel, P.C.

(57) ABSTRACT

A method for providing network synchronization with a unified messaging system is provided. The method includes receiving and storing message data, such as voice data, for a specified recipient. An enhanced e-mail message is generated for the recipient. The message, which is in hypertext mark-up language (HTML) format, includes the message data and a synchronization link that points to a web server. The message is sent to the recipient through an e-mail server corresponding to an e-mail client associated with the recipient. When the client downloads the message from the server and renders the HTML, the synchronization link is fetched. As a result, the web server receives a hypertext transfer protocol (HTTP) request from the client based on the message and provides network synchronization based on that HTTP request.

20 Claims, 2 Drawing Sheets

METHOD AND SYSTEM FOR PROVIDING NETWORK SYNCHRONIZATION WITH A UNIFIED MESSAGING SYSTEM

TECHNICAL FIELD

The present invention relates generally to communication systems and, more particularly, to a method and system for providing network synchronization with a unified messaging system.

BACKGROUND

As demand has increased for simplified communication, unified messaging systems have been developed and implemented in order to streamline messaging systems. For example, some unified messaging systems allow voice mail, faxes and e-mail to be combined so that users may receive all of these types of communications through a single application.

However, existing unified messaging systems often use software on the e-mail client, which is generally expensive from a support perspective, or require direct connectivity to an e-mail server that hosts the client, which requires that the system have access to the server and know the user's password, in order to synchronize network content with the e-mail infrastructure. In addition, accessing the e-mail servers in conventional network configurations is problematic due to network topology and security issues.

SUMMARY

In accordance with the present invention, a method and system for providing network synchronization with a unified messaging system are provided that substantially eliminate or reduce disadvantages and problems associated with conventional methods and systems.

According to one embodiment of the present invention, a method for providing network synchronization with a unified messaging system is provided that includes receiving and storing message data, such as voice data, for a specified recipient. An enhanced e-mail message is generated for the recipient. The message, which is in hypertext mark-up language (HTML) format, includes the message data and a synchronization link that points to a web server. The message is sent to the recipient through an e-mail server corresponding to an e-mail client associated with the recipient. When the client downloads the message from the server and renders the HTML, the synchronization link is fetched. As a result, the web server receives a hypertext transfer protocol (HTTP) request from the client based on the message and provides network synchronization based on that HTTP request.

According to another embodiment of the present invention, a unified messaging system is provided that includes a media application server and a web server. The media application server is able to receive and store message data for a specified recipient and to generate an enhanced e-mail message for the recipient based on the message data. The enhanced e-mail message includes the message data and a synchronization link that points to the web server. The web server is coupled to the media application server and is able to receive a hypertext transfer protocol (HTTP) request from an e-mail client associated with the recipient based on the enhanced e-mail message and to provide network synchronization based on the HTTP request.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
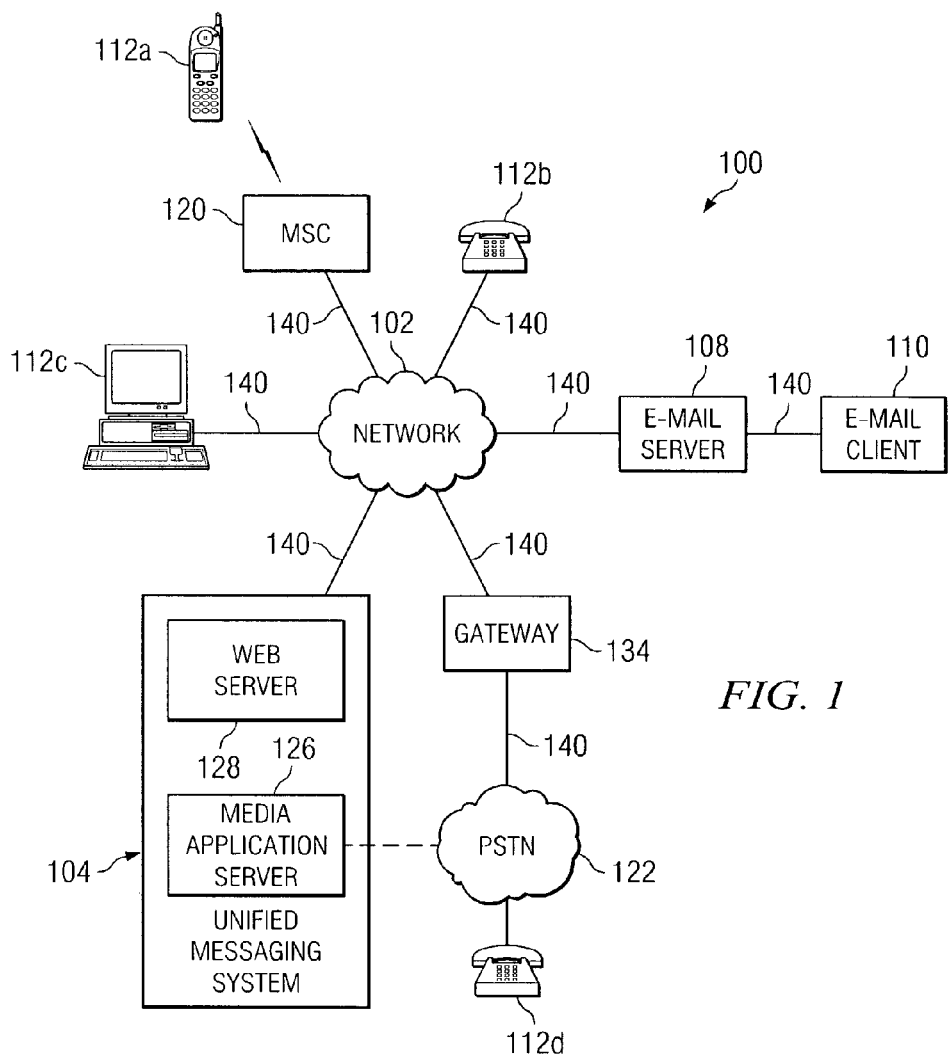
FIG. 1 is a block diagram illustrating a communication system in accordance with one embodiment of the present invention.
Figure 3:
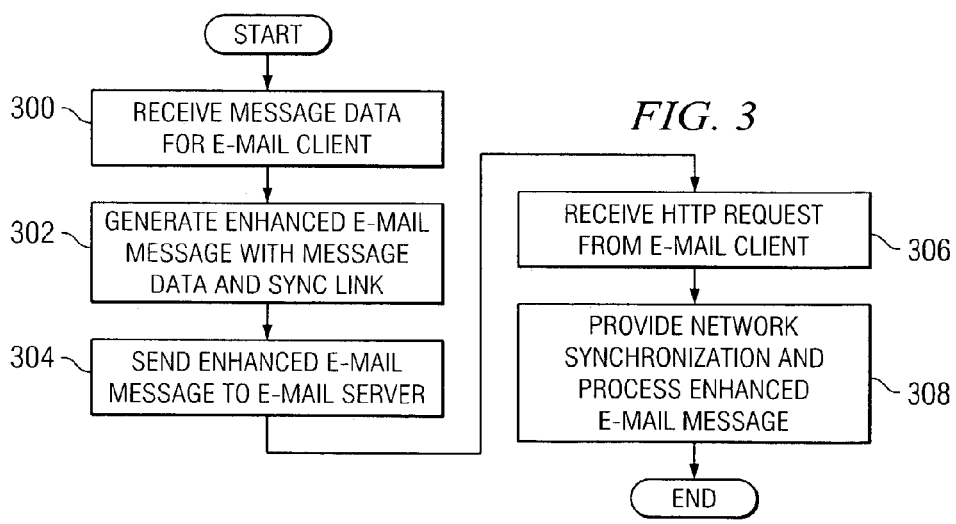
FIG. 3 is a flow diagram illustrating a method for providing network synchronization with the unified messaging system of FIG. 1 in accordance with one embodiment of the present invention.
Figure 2:
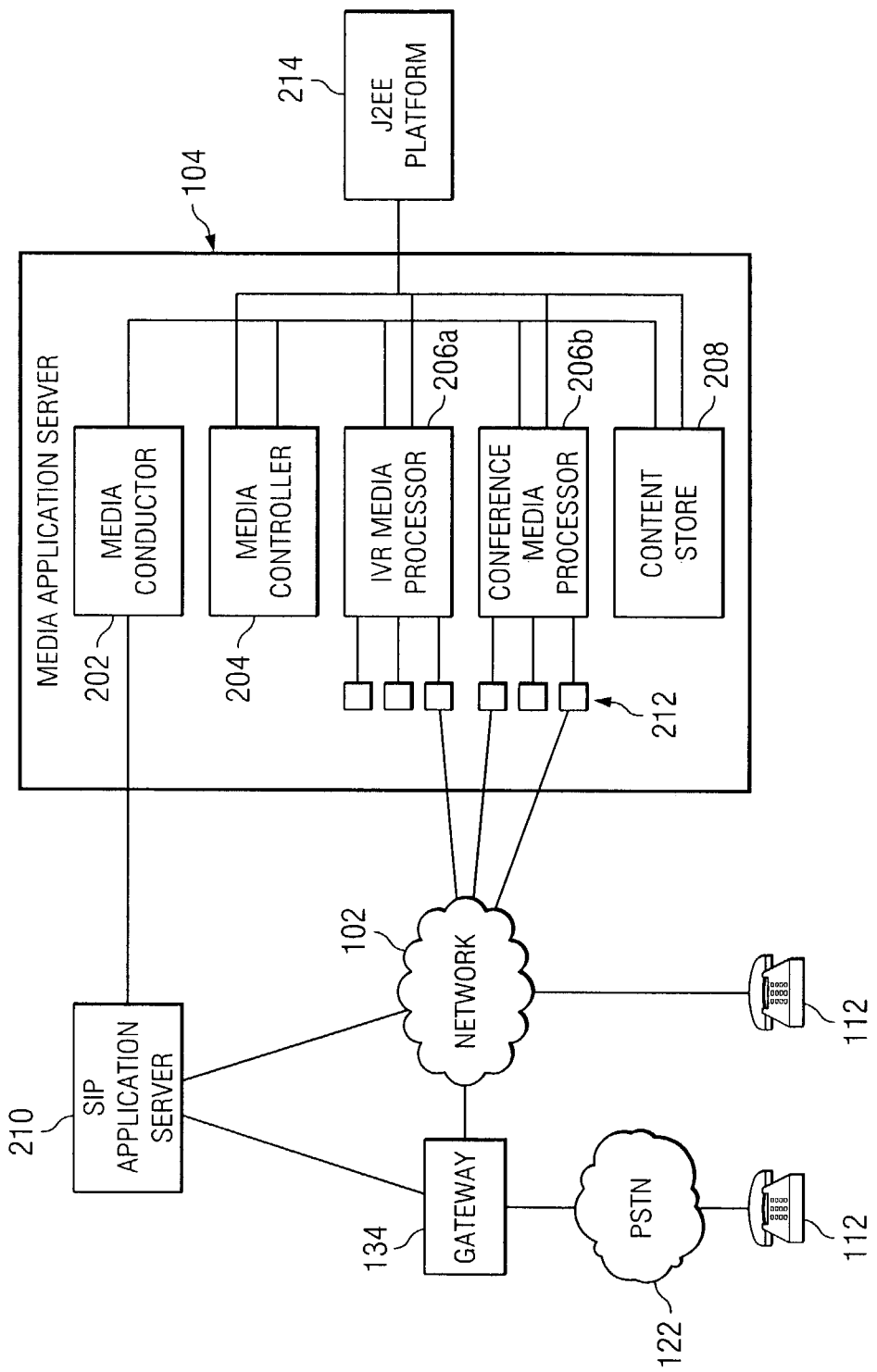
FIG. 2 is a block diagram illustrating the Media Application Server of FIG. 1 in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged communication system.

FIG. 1 is a block diagram illustrating a communication system 100 in accordance with one embodiment of the present invention. As described in more detail below, the communication system 100 is operable to provide network synchronization for processing e-mail messages without the need for additional software at the e-mail server or user interaction. Thus, the communication system 100 may allow unified messaging to be implemented using any conventional e-mail server without hosting the e-mail on the unified messaging platform.

The communication system 100 is shown including a network 102, a unified messaging system 104, at least one e-mail server 108 and at least one e-mail client 110. The communication system 100 also includes a plurality of communication devices 112 and may include at least one mobile switching center (MSC) 120 and at least one public telephone network 122, such as a public switched telephone network (PSTN).

The network 102 is coupled to the unified messaging system 104 and the e-mail server 108 and may also be coupled to the mobile switching center 120 and/or some of the communication devices 112. In this document, the term "couple" refers to any direct or indirect communication between two or more components, whether or not those components are in physical contact with each other.

The network 102 is operable to facilitate communication between components of the communication system 100. For example, the network 102 may communicate Internet Packets ("IP"), frame relay frames, Asynchronous Transfer Mode ("ATM") cells, or other suitable information between network addresses. The network 102 may include one or more local area networks ("LANs"), metropolitan area networks ("MANs"), wide area networks ("WANs"), all or portions of a global network such as the Internet, or any other communication system or systems at one or more locations.

The unified messaging system 104 is shown including a Media Application Server 126 and a web server 128. The Media Application Server 126 and the web server 128 may communicate with each other. According to one embodiment, the unified messaging system 104 is operable to provide enhanced e-mail functionality for any e-mail client 110 from any communication device 112 in the communication system 100. As used herein, "enhanced e-mail" means e-mail comprising an audio message, such as a voice message, and/or a video message. For this embodiment, the unified messaging system 104 is operable to receive message data from a communication device 112 for a particular recipient, to store the message data, and to generate an enhanced e-mail message for the recipient based on the message data.

The enhanced e-mail message generally includes the audio message and/or video message as an attachment. However, it will be understood that the enhanced e-mail message may include the audio message and/or video message in any suitable form. According to one embodiment, the audio message and/or video message may be included as an attachment in a compressed format.

The enhanced e-mail message is constructed to include a hypertext mark-up language ("HTML") body having a synchronization link. A synchronization link comprises a hypertext transfer protocol ("HTTP") uniform resource locator (URL) with message-specific header data pointing to the web server 128. The Media Application Server 126 is operable to send the enhanced e-mail message over the network 102 to the recipient. For example, the Media Application Server 126 may be operable to send the message to an e-mail server 108 for a corresponding e-mail client 110 associated with the recipient.

Thus, when the e-mail client 110 downloads the enhanced e-mail message from the e-mail server 108 and renders the HTML, the synchronization link is fetched and the web server 128 identified in the header data is accessed. The URL includes information that is unique to the message that is to be synchronized: to the e-mail client 110, an HTTP URL is being fetched, and to the web server 128, an HTTP request with additional header information is being received. In this way, network synchronization may occur, which allows the Media Application Server 126 to mark as read, delete, and/or process the message in the Media Application Server 126 in any other suitable way.

According to one embodiment, the Media Application Server 126 includes one or more processors 130 that are operable to execute instructions and one or more memories 132 that are operable to store instructions and data used by the processors 130. One embodiment of the Media Application Server 126 is shown in FIG. 2, which is described below, and in co-pending U.S. patent application Ser. No. 10/610,511 entitled "DISTRIBUTED ARCHITECTURE SUPPORTING COMMUNICATION SESSIONS IN A COMMUNICATION SYSTEM AND METHOD" and filed on the same date herewith, and which is incorporated herein by reference. The microprocessor(s) 130 is generally understood to be a device that drives a general-purpose computer. It is noted, however, that other processor devices, such as microcontrollers or ASICs, can be used as well and achieve the benefits and advantages described herein.

The Media Application Server 126 and the web server 128 may comprise logic encoded in media. The logic comprises functional instructions for carrying out program tasks. The media comprises computer disks or other computer-readable media, application-specific integrated circuits, field-programmable gate arrays, digital signal processors, other suitable specific or general purpose processors, transmission media or other suitable media in which logic may be encoded and utilized.

The e-mail server 108 is operable to provide e-mail services for one or more e-mail clients 110 that are operable to support HTML e-mail messages. The e-mail server 108 may comprise Outlook, Lotus Notes, Netscape Mail, or the like. The e-mail client 110 may comprise Microsoft Exchange, IPlanet, or the like. The e-mail server 108 and the e-mail client 110 may communicate using Post Office Protocol (POP), Internet Message Access Protocol (IMAP), or any other suitable protocol.

Each communication device 112 may comprise any suitable device that is operable to communicate audio data, such as voice or other audio data, to the Media Application Server 126 through the network 102. As shown in the illustrated embodiment, the communication devices 112 may comprise wireless communication devices 112a that are operable to communicate with the network 102 through a mobile switching center 120, wired Internet Protocol ("IP") phones 112b that are operable to communicate directly with the network 102, personal computers 112c with microphones for capturing audio data that are operable to communicate directly with the network 102, telephones 112d that are operable to communicate with the network 102 through a public telephone network 122, and/or any other suitable communication device.

The network 102 and the PSTN 122 may use different protocols to communicate. Thus, in order to facilitate communication between these networks 102 and 122, a gateway 134 that is operable to translate between the different protocols may be used to couple the network 102 to the PSTN 122.

In addition, the Media Application Server 126 may be coupled to the PSTN 122 or the gateway 134. For this embodiment, the Media Application Server 126 is operable to receive message data for an enhanced e-mail message from a communication device 112 without the message data being routed through the network 102.

The various components of the communication system 100 may be coupled to each other via communication lines 140. The communication lines 140 may be any type of communication links capable of supporting data transfer. In one embodiment, the communication lines 140 may comprise, alone or in combination, Integrated Services Digital Network (ISDN), Asymmetric Digital Subscriber Line (ADSL), T1 or T3 communication lines, hardwire lines, or telephone links. It will be understood that the communication lines 140 may comprise other suitable types of data communication links. The communication lines 140 may also connect to a plurality of intermediate servers (not illustrated in FIG. 1) between the components of the communication system 100.

FIG. 2 is a block diagram illustrating the Media Application Server 126 in accordance with one embodiment of the present invention. Thus, although the following describes the Media Application Server 126 in connection with the communication system 100, it will be understood that the Media Application Server 126 may be included as a part of other suitable systems without departing from the scope of the present invention.

In the illustrated embodiment, the Media Application Server 126 includes a media conductor 202, a media controller 204, two media processors 206a-b, and a content store 208.

The media conductor 202 is operable to process signaling messages received by the Media Application Server 126. For example, a communication devices 112 may communicate the signaling messages directly (or via a gateway, which serves as an entrance/exit into a communications network) to the Media Application Server 126. In other embodiments, the communication devices 112 communicate signaling messages indirectly to the Media Application Server 126, such as when a Session Initiation Protocol ("SIP") application server 210 (that received a request from a device 112) sends the signaling messages to the media conductor 202 on behalf of the communication device 112. The communication devices 112 may communicate directly with the SIP application server 210 or indirectly through a gateway, such as gateway 134. The media conductor 202 processes the signaling messages and communicates the processed messages to the media controller 204. As particular examples, the media conductor 202 may implement SIP call control, parameter encoding, and media event package functionality.

The media controller 204 is operable to manage the operation of the Media Application Server 126 to provide services to the communication devices 112 and/or other devices such as video clients and the like. For example, the media controller 204 may receive processed SIP requests from the media conductor 202. The media controller 204 may then select the appropriate media processor 206 to handle each of the calls, enforce licenses controlling how the Media Application Server 126 can be used, and control negotiations based on the licenses. The negotiations may include identifying the CODEC to be used to encode and decode audio or video information during a call and/or other suitable services.

The media processors 206a-b are operable to handle the exchange of audio and/or video information between clients involved in a call. For example, a media processor 206 may receive audio and video information from one client involved in a call, process the information as needed, and forward the information to at least one other client involved in the call. The audio and video information may be received through one or more ports 212, which couple the media processors 206a-b to the network 102. Each port 212 may comprise any suitable structure that is operable to facilitate communication between the Media Application Server 126 and the network 102.

In the illustrated embodiment, each media processor 206 provides different functionality in the Media Application Server 126. For example, the first media processor 206a may provide interactive voice response ("IVR") functionality in the Media Application Server 126. As particular examples, the media processor 206a may support a voice mail function that is able to record and play messages and/or an auto-attendant function that is able to provide a menu to direct callers to particular destinations based on their selections. The media processor 206b may provide conferencing functionality in the Media Application Server 126, such as by facilitating the exchange of audio and/or video information between clients.

The content store 208 is operable to provide access to content used by the various components of the communication system 100. For example, the content store 208 may provide access to stored voice mail messages, access codes used to initiate or join conference calls and/or any other suitable information. The content store 208 may comprise a conventional database or any other suitable data storage facility.

According to one embodiment, a Java 2 Enterprise Edition ("J2EE") platform 214 may be coupled to the Media Application Server 126. In a particular embodiment, the J2EE platform 214 may correspond to the web server 128. The J2EE platform 214 is operable to allow the Media Application Server 126 to retrieve information used to provide services to users in the communication system 100. For example, the J2EE platform 214 may provide audio announcements used by the interactive voice response media processor 206a. The J2EE platform 214 represents one possible device used to serve audio or other information to the Media Application Server 126. However, it will be understood that any suitable device may be used to provide information to the Media Application Server 126 without departing from the scope of the present invention.

In a particular embodiment, the various components of the Media Application Server 126 comprise software processes that may be executed by the processor 130 of the Media Application Server 126. While the components 202, 204, 206a-b and 208 have been described as being executed by a Media Application Server 126, it will be understood that the software processes may be executed by any other suitable computing device without departing from the scope of the present invention.

Although FIG. 2 illustrates one example of a Media Application Server 126, various changes may be made to FIG. 2 while maintaining the advantages and functionality recited herein. For example, any number of media processors 206a-b may be used in the Media Application Server 126. Also, the functional divisions shown in FIG. 2 are for illustration only. Various components can be combined or omitted or additional components can be added according to particular functional designations or needs.

FIG. 3 is a flow diagram illustrating a method for providing network synchronization with the unified messaging system 104 in accordance with one embodiment of the present invention. The method begins at step 300 where the Media Application Server 126 receives and stores message data for a recipient associated with a specified e-mail account and client 110. As used herein, "message data" means audio data and/or video data for an enhanced e-mail message. At step 302, the Media Application Server 126 generates an enhanced e-mail message with the message data and a synchronization link pointing to the web server 128.

At step 304, the Media Application Server 126 sends the enhanced e-mail message to the e-mail server 108 that hosts the specified e-mail client 110. The specified e-mail client 110 downloads the enhanced e-mail message from the e-mail server 108 and views the message. This results in the HTML of the enhanced e-mail message being rendered, causing the synchronization link to be fetched so that the web server 128 receives an HTTP request from the specified e-mail client 110 at step 306. The HTTP request identifies the specified e-mail client 110 and the enhanced e-mail message in the header data.

At step 308, the web server 128 provides network synchronization based on the HTTP request and processes the enhanced e-mail message. For example, the message may be marked as read, deleted, or processed in any other suitable way.

In this way, the unified messaging system 104 may be implemented, resulting in network synchronization without the need for additional software or user interaction. In addition, because the synchronization is accomplished through an HTTP request, there is no need to modify firewalls or existing security systems.

It may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and if the term "controller" is utilized herein, it means any device, system or part thereof that controls at least one operation, such a device may be implemented in hardware, firmware or software, or some combination of at least two of the same. It should be noted that the functionality associated with any particular controller may be centralized or distributed, whether locally or remotely.

Although the present invention has been described with several embodiments, various changes and modifications may be suggested to one skilled in the art. It is intended that the present invention encompass such changes and modifications as fall within the scope of the appended claims.

What is claimed is:

1. A method for providing network synchronization with a unified messaging system, comprising:
    receiving and storing message data for a specified recipient;
    generating an enhanced e-mail message, the message comprising the message data and a synchronization link;
    sending the enhanced e-mail message to the specified recipient;
    receiving a hypertext transfer protocol (HTTP) request from an e-mail client associated with the recipient, the HTTP request generated by the e-mail client in response to rendering of the enhanced email message by the e-mail client; and
    providing network synchronization based on the received HTTP request without additional recipient interaction.

2. The method of claim 1, sending the message to the recipient comprising sending the enhanced e-mail message to an e-mail server corresponding to the e-mail client associated with the recipient, the e-mail server operable to send the enhanced e-mail message to the e-mail client for the recipient.

3. The method of claim 2, further comprising processing the message data, and wherein processing the message data further comprises marking the message data as read.

4. The method of claim 1, the synchronization link pointing to a web server and receiving the HTTP request comprising receiving the HTTP request at the web server.

5. The method of claim 1, the enhanced e-mail message comprising hypertext mark-up language (HTML) and receiving the HTTP request from the e-mail client based on the enhanced e-mail message comprising receiving the HTTP request in response to the HTML of the enhanced e-mail message being rendered.

6. The method of claim 1, further comprising processing the message data by marking the message data as read.

7. The method of claim 1, further comprising processing the message data by deleting the message data.

8. A unified messaging system, comprising:
    a media application server comprising a processor coupled to a memory, operable to receive and store message data for a specified recipient and to generate an enhanced e-mail message for the recipient based on the message data, the media application server comprising at least one processor, the enhanced e-mail message comprising the message data and a synchronization link; and
    a web server coupled to the media application server, the web server operable to receive a hypertext transfer protocol (HTTP) request from an e-mail client associated with the recipient, the request generated by the e-mail client in response to rendering of the enhanced email message by the e-mail client and to provide network synchronization based on the received HTTP request without additional recipient interaction, the synchronization link pointing to the web server.

9. The system of claim 8, the web server further operable to process the message data.

10. The system of claim 9, the web server operable to process the message data by marking the message data as read.

11. The system of claim 9, the web server operable to process the message data by deleting the message data.

12. The system of claim 8, the media application server further operable to send the enhanced e-mail message to the specified recipient via an e-mail server corresponding to the e-mail client associated with the recipient, the e-mail server operable to send the enhanced e-mail message to the e-mail client for the recipient.

13. The system of claim 8, the enhanced e-mail message comprising hypertext mark-up language (HTML) and the web server operable to receive the HTTP request from the e-mail client in response to the HTML of the enhanced e-mail message being rendered.

14. A unified messaging system, comprising:
    a non-transitory computer-readable storage media; and
    instructions stored on the computer-readable storage media, the instructions operable for causing the unified messaging system to receive and store message data for a specified recipient, to generate an enhanced e-mail message, the enhanced e-mail message comprising the message data and a synchronization link, to send the enhanced e-mail message to the specified recipient, to receive a hypertext transfer protocol (HTTP) request from an e-mail client associated with the recipient, the request generated by the e-mail client in response to rendering of the enhanced email message by the e-mail client, and to provide network synchronization based on the HTTP request without additional recipient interaction.

15. The system of claim 14, the instructions further operable for causing the unified messaging system to process the message data.

16. The system of claim 15, the instructions further operable for causing the unified messaging system to process the message data by marking the message data as read.

17. The system of claim 15, the instructions further operable for causing the unified messaging system to process the message data by deleting the message data.

18. The system of claim 14, the synchronization link pointing to a web server and the instructions further operable for causing the unified messaging system to receive the HTTP request by receiving the HTTP request at the web server.

19. The system of claim 14, the instructions further operable for causing the unified messaging system to send the enhanced e-mail message to the specified recipient by sending the enhanced e-mail message to an e-mail server corresponding to the e-mail client associated with the recipient, the e-mail server operable to send the enhanced e-mail message to the specified e-mail client for the recipient.

20. The system of claim 14, the enhanced e-mail message comprising hypertext mark-up language (HTML) and the instructions further operable for causing the unified messaging system to receive the HTTP request from the e-mail client based on the enhanced e-mail message by receiving the HTTP request in response to the HTML of the enhanced e-mail message being rendered.

* * * * *